June 4, 1968   G. E. KRULLS   3,387,155
REMOVABLE BRUSH MAGAZINE ARRANGEMENT
Filed Aug. 11, 1965   4 Sheets-Sheet 1
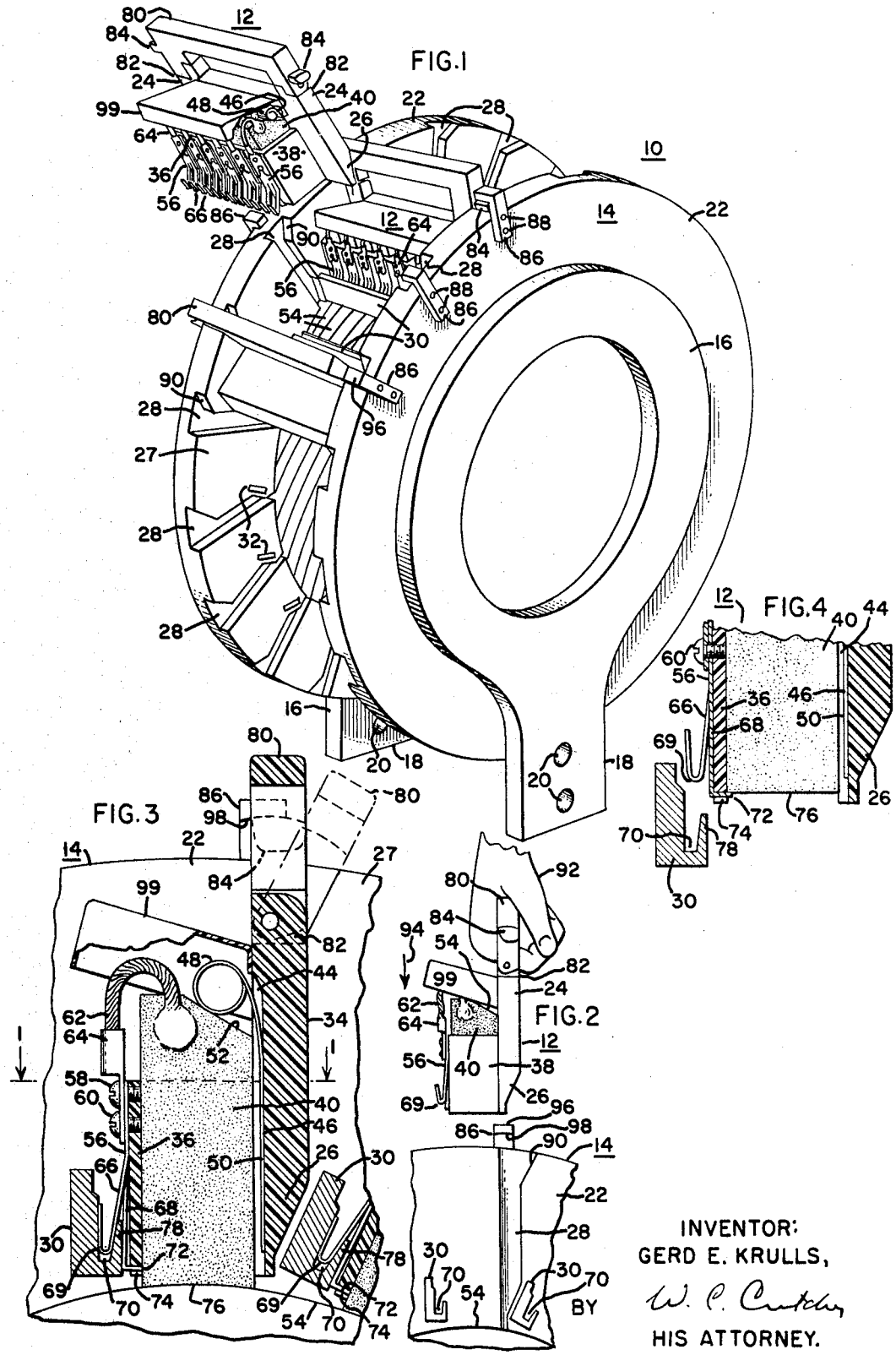
INVENTOR:
GERD E. KRULLS,
BY W. P. Crutchy
HIS ATTORNEY.

June 4, 1968  G. E. KRULLS  3,387,155
REMOVABLE BRUSH MAGAZINE ARRANGEMENT
Filed Aug. 11, 1965  4 Sheets-Sheet 2
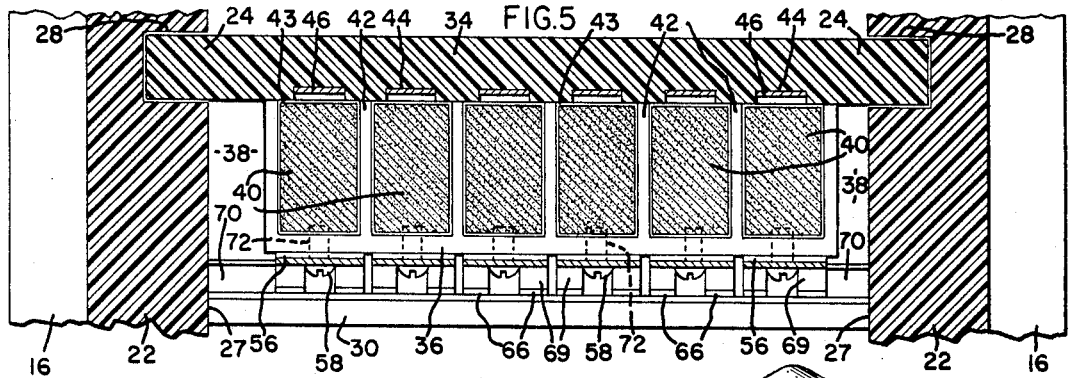
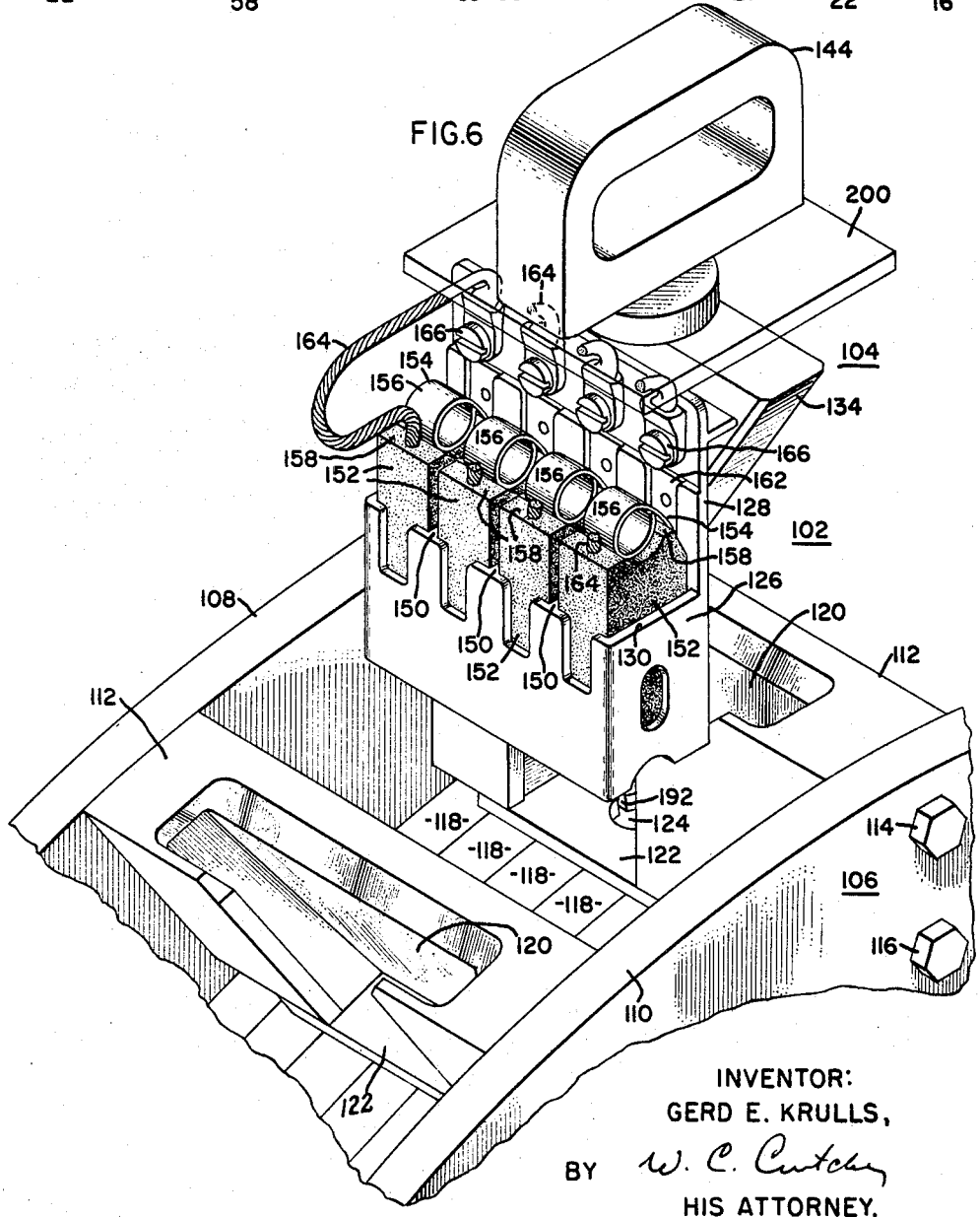
INVENTOR:
GERD E. KRULLS,
BY W. C. Crutcher
HIS ATTORNEY.

June 4, 1968  G. E. KRULLS  3,387,155
REMOVABLE BRUSH MAGAZINE ARRANGEMENT
Filed Aug. 11, 1965  4 Sheets-Sheet 3
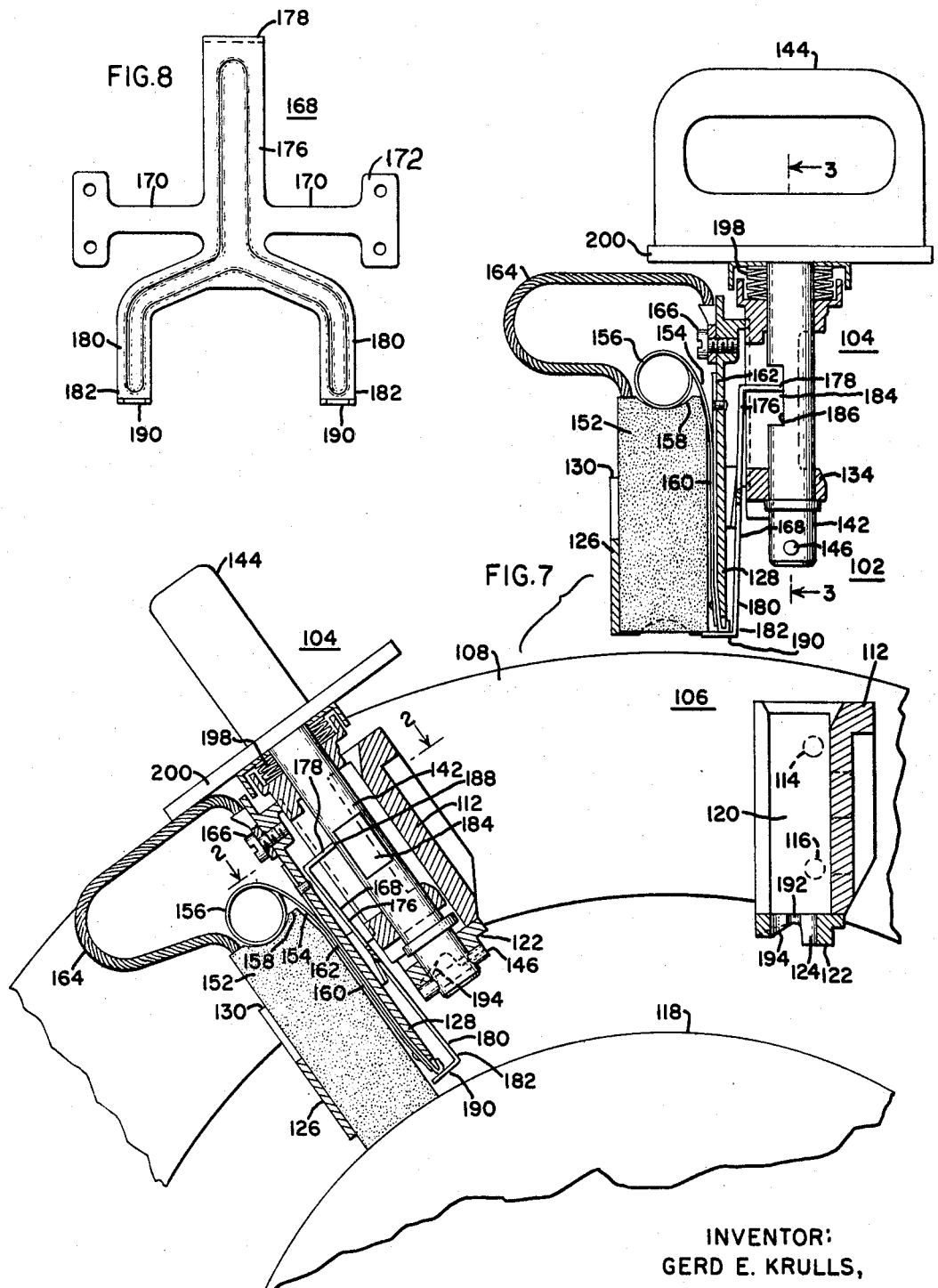
INVENTOR:
GERD E. KRULLS,
BY W. C. Crutcher
HIS ATTORNEY.

June 4, 1968  G. E. KRULLS  3,387,155
REMOVABLE BRUSH MAGAZINE ARRANGEMENT
Filed Aug. 11, 1965  4 Sheets-Sheet 4
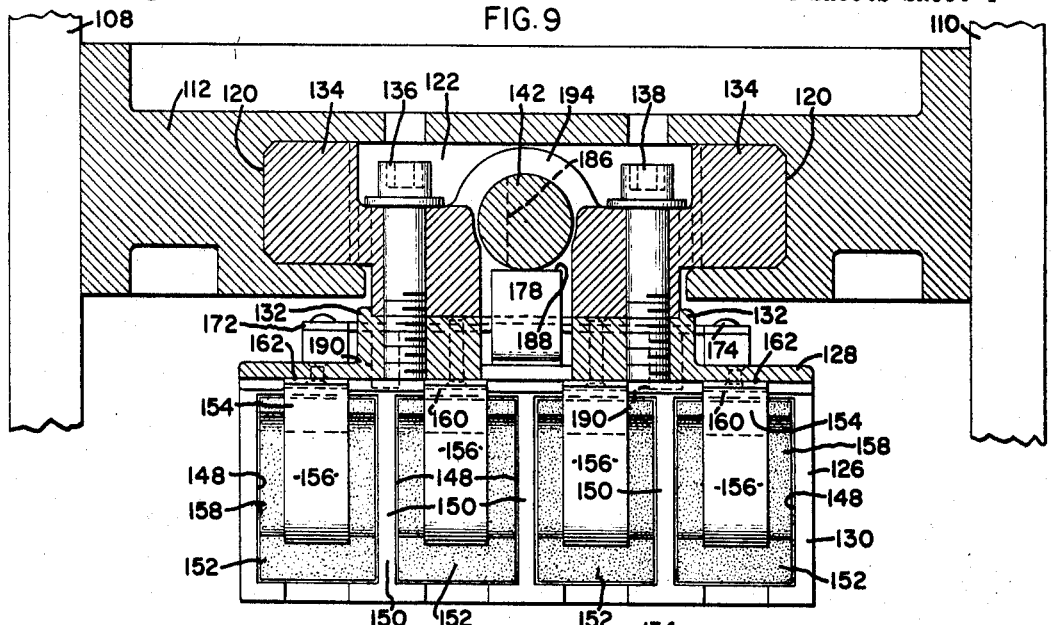
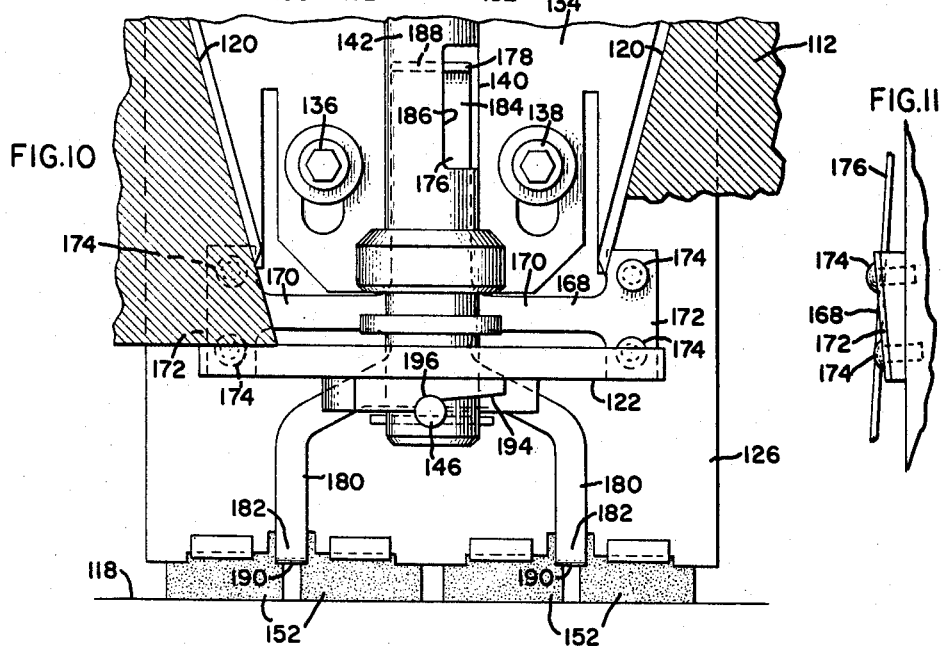
INVENTOR:
GERD E. KRULLS,
BY W. C. Crutcher
HIS ATTORNEY.

United States Patent Office 3,387,155
Patented June 4, 1968

3,387,155
REMOVABLE BRUSH MAGAZINE
ARRANGEMENT
Gerd E. Krulls, Scotia, N.Y., assignor to General Electric
Company, a corporation of New York
Filed Aug. 11, 1965, Ser. No. 478,825
20 Claims. (Cl. 310—239)

ABSTRACT OF THE DISCLOSURE

A removable brush magazine for holding and replacing a number of brushes simultaneously in a dynamoelectric machine and having a rotatable insulating handle for manipulating the magazine and securing it in place.

This invention relates to a removable brush magazine arrangement. More specifically, it relates to a removable brush magazine arrangement wherein a plurality of brushes can be removed from and replaced on a dynamoelectric machine while the machine is energized.

The trend in the design of electric generators for power systems has been to larger and larger units. Single generator outputs of over a million kilowatts are conceivable within the near future, as even now single generator outputs are approaching a million kilowatts capacity. With generators of such larger capacity, the size and number of brushes have both become unwieldly large from a maintenance point of view. On such generators the collector rings are axially quite long, with several brushes being positioned in an axial side-by-side relationship to collect current from the rings. Furthermore, a plurality of such side-by-side brush sets are spaced around the circumference of the collector rings to provide the necessary contact area between brush ends and the collector rings.

In such an arrangement using present brush gear, the mechanical manipulations required to replace a brush or set of side-by-side brushes are quite extensive and sometimes difficult, usually calling for the disconnection of the generator from the power system, and bringing its rotor to rest. The de-energization of such a large generator and bringing its rotor to a stop merely to replace brushes which require periodic replacement is costly to the generator operator, both in terms of loss of power output and in the man-hours required to replace the brushes.

It is an object of this invention to provide a removable brush magazine arrangement wherein a plurality of brushes can be removed from and replaced on a dynamoelectric machine with relatively few mechanical manipulations, and which manipulations are easy to perform.

It is an object of this invention to provide a removable brush magazine which may be removed from and replaced on a dynamoelectric machine by an operator without danger of electrical shock, while the machine is energized and rotating.

It is an object of this invention to provide a removable brush holder which may be removed from and replaced on a dynamoelectric machine without the use of hand or power tools.

It is another object of this invention to provide a removable brush magazine arrangement in which brushes are retained within the magazine until the magazine is replaced on a dynamoelectric machine, whereupon the brushes are automatically released so that the brush ends engage the collector rings.

These objects are accomplished in accordance with this invention, in one form thereof, by providing a brush magazine which is easily removed from and replaced in a dynamoelectric machine. The brush magazine receives a plurality of brushes in a side-by-side relationship. The brushes are provided with flexible conductors for connection with electrical connectors carried by the magazine. A handle is provided on the brush magazine for removing it from or replacing it in the dynamoelectric machine. This handle is rotatable, and operates a locking device for securing the magazine to the dynamoelectric machine. The brush magazine is further provided with a mechanism for retaining brushes in the magazine until it is installed in the machine, whereupon the brushes are automatically released by the retaining mechanism to engage the collector rings.

Other objects and further details of that which is believed to be novel in the invention will be clear from the following description and claims taken with the accompanying drawings wherein:

FIG. 1 is a perspective view of a first embodiment of the removable brush magazine arrangement of this invention.

FIG. 2 is an enlarged side view of a portion of the removable brush magazine arrangement shown in FIG. 1, with some portions removed.

FIG. 3 is an enlarged cross-sectional view of a portion of the removable brush magazine arrangement shown in FIG. 1, taken along one of the side faces of a brush.

FIG. 4 is a detailed cross-sectional view of an enlarged portion of the removable brush magazine arrangement shown in FIG. 1, taken along one of the side faces of a brush.

FIG. 5 is an enlarged cross-sectional view of the removable brush magazine taken along the line 1—1 in FIG. 3.

FIG. 6 is a perspective view of a portion of a removable brush magazine arrangement of a second embodiment of this invention.

FIG. 7 is a cross-sectional view of the portion of the removable brush magazine arrangement shown in FIG. 6.

FIG. 8 is an enlarged plan view of the brush retaining lever of the removable brush magazine arrangement shown in FIG. 6.

FIG. 9 is an enlarged cross-sectional view of a portion of the removable brush magazine arrangement shown in FIG. 7 taken along the line 2—2 in FIG. 7.

FIG. 10 is an enlarged cross-sectional view of a portion of the removable brush magazine arrangement shown in FIG. 7 taken along the line 3—3 in FIG. 7.

FIG. 11 is an enlarged detailed cross-sectional view of the mounting of the brush retaining spring shown in FIG. 8.

A removable brush magazine arrangement in accordance with the invention is shown in FIG. 1, and is shown in more detail in FIGS. 2 through 5 and is designated generally by reference number 10. The removable brush magazine arrangement includes a plurality of removable brush magazines 12 and a stationary structure 14 for supporting the magazines. The stationary structure 14 is supported from a stationary portion of a dynamoelectric machine (not shown) by a pair of stationary contact members 16. The stationary contact members 16 are generally ring-shaped bus bars having mounting or connecting arms 18 extending radially therefrom. The removable brush magazine arrangement 10 is supported from the stationary portion of the dynamoelectric machine by fastening devices which pass through holes 20 in the mounting arms 18. The stationary portion of the dynamoelectric machine is preferably the stationary bus bar to which the brushes are to be connected.

The stationary structure 14 also includes radially extending annular rings 22 which are formed of an insulating material and supported on feet (not shown). The rings 22 may be secured to the ring-shaped bus bars 16 in any suitable manner, such as by riveting or bolting. Means are provided for securing the brush magazines 12 to the insulating annular rings 22. The securing means includes guide means in the form of a pair of abutments 24 which are generally of a rectangular shape, with a tapered end portion 26. Facing surfaces 27 of the annular rings 22 are provided with mating guide means in the form of grooves 28 for receiving the abutments 24. The grooves 28 are provided with a shape conforming to that of the abutments 24, such that the brush magazines 12 are positively positioned with respect to the annular rings 22.

The stationary structure 14 further comprises cross-bus bars 30, located adjacent the lower end of each groove 28, and extending between the ring-shaped bus bars 16. The cross-bus bars 30 are secured to and electrically connected to the ring-shaped bus bars 16. For clarity of illustration, all of the cross-bus bars 30 are not shown in FIG. 1. Rather, in the lower left hand portion of the figures, the bus bars are removed to show the apertures 32 formed in the annular ring 22 through which the cross-bus bars 30 pass to be secured to the ring-shaped bus bars 16.

Before describing the manner in which a brush magazine 12 is secured in the removable brush magazine stationary structure 14, the structure of the brush magazine 12 will be reviewed with particular reference to FIGS. 1 and 3. Brush magazine 12 is formed of an insulating material, having a relatively thick rear wall portion 34 extending between the rectangular abutments 24, and being of the same thickness as the abutments. A front wall 36 and a pair of side walls 38, together with the rear wall 34, provide a rectangular enclosure in which a plurality of brushes 40 are mounted. As is best seen in FIG. 5, the front wall 36 and side walls 38 are thinner than the rear wall 34. Extending between the front wall 36 and the rear wall 34 are a plurality of dividers 42, which together with the side walls 38, front wall 36, and rear wall 34, form a plurality of rectangular brush chambers 43, each of which receives a brush 40. A groove 44 is provided in the rear wall 34 of the magazine at the center of each of the rectangular brush chambers 43. A plurality of leaf springs 46 have coiled ends 48, and straight portions 50 which are placed in grooves 44, and secured to the rear wall 34. The coiled ends 48 apply biasing pressure to upper ends 52 of the brushes 14. This biasing pressure on the brushes 40 bias them toward collector rings 54 shown in FIG. 1.

The brushes 40 are electrically connected to the cross-bus bars 30 through a plurality of resilient members 56 which are secured to the outer surface of the front wall 36, by a pair of screws 58 and 60. Resilient members 56 have a dual function, serving both to electrically connect the brushes 40 to the cross-bus bars 30, and to retain the brushes 40 within the magazine 12 until it is installed in operating position in the stationary structure 14. Each of brushes 40 is provided with a flexible lead 62 which in turn is provided with a connector 64 which is secured to one of the resilient members 56 by the screws 58 and 60. The free lower ends of the resilient members 56 are trifurcated, so as to form a pair of outer legs 66 and a center leg 68. The free ends 69 of the outer legs 66 are bent in a U shape, to engage a similarly shaped slot 70 in the cross-bus bars 30. The center leg serves as a means for retaining the brushes 40 within the magazine while the magazine is being positioned with respect to the stationary structure 14.

As is best seen in FIG. 4, when the brush magazine 12 is spaced from the stationary structure 14 the center leg 68 of the resilient member 56 lays along side the front wall 36, and a right angle tab portion 72 of center leg 68 passes through a notch 74 in the front wall to pass under the lower end 76 of the brush to retain the brush within the magazine against the bias force of spring 46. As the magazine 12 approaches its operating position in the stationary structure 14, the U-shaped free ends 69 of the outer legs 66 are engaged by a portion 78 of the cross-bus bar 30. The slot 70 in the cross-bus bar 30 is wider at the top than it is at the bottom, so that as the brush magazine 12 is moved into its operating position the outer legs 66 of the resilient members 56 are deflected away from the front wall 36 of the brush magazine. The deflection of the outer legs 66, cause a similar deflection of the center legs 68. The deflection of the center leg 68 away from the front wall 36 of a brush magazine causes the tab 72 to be withdrawn from under the lower end 76 of the brush, thereby releasing the brush as shown in FIG. 3 to engage the collector ring 54.

A handle 80 formed of an insulating material is provided for removing the brush magazine 12 from, and replacing it in, the stationary structure 14. The handle 80 is pivotally secured to extensions 82 of the abutments 24. Means are provided on the handle 80 and on the annular rings 22, for securing the brush magazine 12 to the stationary structure 14. The means provided on the handle 80 is a pair of projections 84 which extend outwardly from the handle. Associated with each groove 28 in the annular rings 22 is a dog 86. The dog 86 is L-shaped, the longer leg being secured to the outer face of the annular rings 22 by fastening means 88 and the shorter legs extending over the periphery of the ring 22 and the outer end of groove 28. While the grooves 28 generally conform to the shape of the abutments 24, the outer end of the groove 28 is flared as shown at 90.

Referring to FIGS. 2 through 4, the installation of a brush magazine 12 in the stationary structure 14 will be described. The operator's hand 92 is shown grasping the handle 80 in FIG. 2, with the magazine 12 in the proper position to be inserted within the stationary structure 14. The operator moves the magazine in a direction indicated by the arrow 94 until the lower edge of the projection 84 engages top edge 96 of the dog 86. At this point the operator pivots the handle in a clockwise direction, to the position shown by the dotted lines in FIG. 3. The operator continues to move the magazine 12 into the stationary structure until the projection 84 has passed below lower edge 98 of the dog 86. At this point the operator pivots the handle in a counterclockwise direction, back to its vertical position, thereby securing the projection 84 under the lower edge 98 of the dog, as is shown by the full lines in FIG. 3, and in FIG. 1.

While the operator's hand is protected from the energized brushes by the insulating handle 80, additional insulating protection is provided between the live electrical members such as the flexible conductors 62 and the brushes 40, by an insulating means such as an insulating cover 99. The cover 99 may be formed integrally with the magazine.

In removing a brush magazine 12 from the stationary structure 14, the operator again grasps the handle, depressing it enough to release the projections 84 from the lower edges 98 of the dogs so that the handle can be rotated in a clockwise direction to the position shown by the dotted lines in FIG. 3. The operator then continues to move the brush magazine 12 away from the stationary structure 14 thereby removing it from the machine. It will be noted that when the magazine is removed from the machine, the tab portions 72 of the center legs 68 engage the sides of the brush as shown in FIG. 3. They do not pass under the lower end 76 of the brushes as shown in FIG. 4. While the tab portions 72 may exert enough force against the side of the brush to retain it in its position within the magazine, should it not exert sufficient force, the brush will not fall out of the magazine 12 due to their connection by the flexible lead 62.

A second embodiment of the removable brush magazine is shown generally in FIG. 6 and specific details are shown in FIGS. 7 through 11. The removable brush magazine arrangement 102 includes a plurality of removable brush magazines 104 and a stationary structure 106 for supporting the magazines 104. The stationary structure 106 is supported from a stationary portion of a dynamoelectric machine (not shown) by stationary metal means, which are shown as a spaced pair of radially extending annular rings 108 and 110. The annular rings 108 and 110 may be provided with radially extending mounting or connecting arms such as those indicated in the first embodiment by the numeral 18. Similar to the ring-shaped bus bars 16 in the first embodiment, the annular rings 108 and 110 in the second embodiment serve as electrical connectors between the brushes and stationary conductors wtihin the dynamoelectric machine.

The stationary structure 106 of the removable brush magazine arrangement further comprises a plurality of metal cross-bars 112 which extend between the two annular rings 108 and 110. The metal cross-bars 112 are secured to the annular rings 108 and 110 by fastening devices such as bolts 114 and 116, the heads of which are shown in FIG. 6. The stationary structure 106 is positioned in the dynamo-electric machine such that the cross-bars 112 are located over collector rings 118. The metal cross-bars 112 are provided with a wedge shaped slot 120 which is tapered in the inward direction. The lower end of the slot is closed by a plate 122 having a hole 124 herein.

The removable brush magazine 104 includes a rectangular metal brush box 126. The rear wall 128 of the brush box extends above the top edge 130 of the other sides of the boxes. As is best seen in FIG. 9, the rear wall 128 is provided with a pair of thickened portions 132 located on each side of the center of the wall and extending in the vertical direction. To the thickened portions 132 is secured a wedge-shaped mounting portion or block 134. The walls of the wedge-shaped mounting portion are formed to mate with the walls of the wedge-shaped slot 120. The wedge-shaped mounting block 134 is secured to the thickened portions 132 of the brush box 126 by two pairs of bolts 136 and 138.

An aperture 140 is provided through the wedge-shaped mounting block 134 for receiving a shaft 142. The shaft 142 also passes through the hole 124 provided in the plate 122. An insulating handle 144 is secured to the top end of the shaft, while a pin 146 passes through a diametrical hole in the lower end of the shaft. The shaft 142 is rotatably received within the mounting block 134, and its rotation serves two functions: releasing the brushes upon positioning of the brush magazine 104 in operating position in the stationary structure 106, and securing the removable brush magazine 104 to the stationary structure 106.

The brush box 126 is divided into a plurality of brush chambers 148 by a plurality of dividers 150. In each chamber 148 is positioned a brush 152. A downward bias on the brushes 150 is provided by leaf springs 154 which have coiled portions 156 resting on the top ends 158 of the brushes. A straight portion 160 of each leaf spring is secured to a metal plate 162, which is in turn secured to the rear wall 128 of the brush box. The brushes 152 are provided with flexible leads 164 which are secured to the rear wall 128 by screws 166.

As is best seen in FIG. 7, and in particular in the brush magazine 104 shown spaced from the stationary structure 106, the brushes are retained in brush box 126 by a retaining means or resilient brush retaining lever 168. Referring to FIG. 8, it will be seen that the resilient lever comprises a pair of horizontally extending arms 170 which terminate in enlarged end sections 172. The end sections 172 are secured to the rear wall 128 of the brush box by fastening members 174, as is best seen in FIG. 11. The brush retaining lever 168 also comprises a central vertically extending arm 176. The end 178 of the vertical arm 176 is bent perpendicular to the arm, and in the direction so as to extend away from the brush box. The brush retaining lever 168 further comprises a pair of outwardly and downwardly extending arms 180. The center of free end 182 of each of these arms lays between a pair of brushes. The ends 182 of the arms 180 are bent at right angles to the arms so as to extend toward the brush box 126.

The operation of the brush retaining means, which includes the brush retaining lever 168 will now be described. The shaft 142 to which the handle 144 is secured is provided with a notch 184 in vertical alignment with the end 178 of the brush retaining spring arm 176. When the handle 144 is turned so that its principal axis is perpendicular to the brush box, base 186 of the notch 180 is parallel to the rear wall 128 of the brush box. The brush retaining lever 168 is secured to rear wall 128, and is so mounted that the vertical arm 176 is biased with a spring force away from the brush box 126. The spring biasing force is derived from torsion in horizontal arms 170 and the resilient deflection of arms 176 and 180. That is, tip 188 of the bent end 178 is resiliently biased into engagement with the periphery of the shaft 142, or with the notch base 186 as shown in FIG. 7. With the tip 188 in engagement with the notch base 186, the arms 180 are spring biased toward the brush box 126, so that bent end portions 190 of arms 180 retain the brushes 152 within the box. Each bent end portion 190 is located between a pair of brushes, and is wide enough so that it passes under the bottom ends of two brushes, as shown in the brush magazine 104 shown in spaced relationship with the stationary structure 106 in FIG. 7.

When the brush magazine 104 is placed in operating position within the stationary structure 106, and the handle is rotated, the tip 188 of the arm 176 is deflected by being displaced from the notch base 186 to the periphery of shaft 142, as is shown in the brush magazine 104 shown positioned in operating relationship with the stationary structure 106 in FIG. 7. When the tip 188 is deflected toward the brush box 126 in the manner just described, the arms 180 are deflected away from the brush box, so that their bent end portions 190 move out from under the brushes, and release the brushes so that they engage the collector rings 118.

Besides releasing the brushes to engage the collector rings 118, rotation of the handle 160 also secures the brush magazine 104 to the stationary structure 106. The means by which it does this includes the plate 122 mounted on the bottom of the metal cross-bar 112 and the pin 146 which extends through the shaft. The plate 122 which is provided with the hole 124 through which the shaft passes, is also provided with a keyway 192 which extends from each side of the hole parallel to the major axis of the cross-bar 112. The brush magazine 104 is moved toward the stationary structure 106 with the handle 144 perpendicular to the major axis of the cross-bars 112, as is shown by the brush magazine 104 spaced from the stationary structure in FIG. 7. With the handle 144 in this position, the pin 146 passes through the keyway 192 so as to be located on the bottom side of the plate 122.

The bottom side of plate 122 is provided with two helical cam surfaces 194, which is best seen in FIGS. 7 and 10. Rotation of the handle in the clockwise direction causes the pin 146 to ride over the cammed surfaces 194, until it engages two notices 196 as is best seen in FIG. 10. As the pin moves over the cammed surfaces 194, the shaft is pulled toward the collector rings 118, whereby compressing a resilient member such as six Belleville washer springs 198, which are positioned between the handle and the top of the wedge-shaped mounting portion 134. The spring bias provided by the Belleville springs 198 provides a positive contact between the walls of the wedge-shaped mounting portion 134 and the walls of the wedge-shaped slot 120, so as to insure a positive electrical connection therebetween.

To remove a brush magazine from a machine, an operator gasps the handle 144, and turns it in a counterclockwise direction until the handle is perpendicular to the major axis of the metal cross bars 30. This aligns the pin 146 with the keyway 192 in the metal plate 122, so that the brush magazine 104 can be removed from the metal cross bar 30. Similarly to the first embodiment, the brush retaining means comprising the brush retaining lever 168 may not positively retain the brush within the magazine upon removal of the magazine. The tip 188 of the bent end 178 of arm 176 will be displaced into engagement with the notch base 186, thereby deflecting the bent end portions 190 of the arms 180 toward the brushes. But, since the brushes extend below the end portions 190, the ends will merely engage the sides of the brushes, and depending upon the pressure of the engagement, will or will not hold the brushes against the downward spring bias of the leaf spring 154. Should the spring bias of the spring arms 180 not hold the brushes, the brushes will be retained partially within the brush magazine by the flexible leads 164.

To further protect an operator from electrical shock during installation and removal of a brush magazine on an energized dynamoelectric machine, an insulating plate 200 is interposed between the insulating handle 144 and the metal portions of the removable brush magazine.

Having thus described and shown two particular embodiments of the invention, other embodiments of the invention will be apparent to those skilled in the art, and it is intended to cover by the appended claims all embodiments falling within the scope thereof.

What is claimed as new and desired to be secured by Letters Patent of the United States is:

1. In a dynamoelectric machine including a rotating cylindrical contact surface and a stationary contact member which is positioned adjacent to but spaced from the cylindrical contact surface and which is to be electrically connected to the cylindrical contact surface, a removable brush magazine arrangement for electrically connecting the cylindrical contact to the stationary contact member comprising:
   (a) a brush magazine,
   (b) stationary means for supporting said brush magazine adjacent the cylindrical contact surface,
   (c) a plurality of brushes mounted in said brush magazine, and having one end normally extending from said magazine to engage the cylindrical contact surface,
   (d) means for electrically connecting said brushes to the stationary contact member,
   (e) a rotatable handle secured to said brush magazine useful for removing said brush magazine from and replacing said brush magazine in the dynamoelectric machine, and
   (f) means operative by the rotation of said handle for securing said brush magazine to said stationary means.

2. The removable brush magazine arrangement defined in claim 1 wherein the rotatable handle is formed of an insulating material such that an operator may grasp the handle without danger of electrical shock therefrom while the dynamoelectric machine is energized.

3. The removable brush magazine arrangement defined in claim 2 wherein an insulating member is interposed between the insulated rotatable handle and the brush magazine, to further protect the operator from the danger of electrical shock.

4. The removable brush magazine arrangement defined in claim 1 wherein a plurality of resilient members are interposed between the other ends of said brushes and said brush magazine for biasing the one ends of said brushes into engagement with the cylindrical contact surface.

5. The removable brush magazine arrangement defined in claim 1 wherein the brush magazine is formed of an insulating material and said means for electrically connecting said brushes to the stationary contact member comprises a plurality of flexible leads attached to said brushes and a plurality of connectors secured to said brush magazine.

6. In a dynamoelectric machine including a rotating cylindrical contact surface and a stationary contact member which is positioned adjacent to but spaced from the cylindrical contact surface and which is to be electrically connected to the cylindrical contact surface, a removable brush magazine arrangement for electrically connecting the cylindrical contact to the stationary contact member comprising:
   (a) a brush magazine,
   (b) stationary means for supporting said brush magazine adjacent the cylindrical contact surface,
   (c) a plurality of brushes mounted in said brush magazine, and having one end normally extending from said magazine to engage the cylindrical contact surface,
   (d) means for electrically connecting said brushes to the stationary contact member,
   (e) retaining means for securing said brushes in said brush magazine while said brush magazine is being positioned with respect to said stationary means, said retaining means being released when said brush magazine is about to assume its operating position,
   (f) a rotatable handle secured to said brush magazine, useful for removing said brush magazine from and replacing said brush magazine in the dynamoelectric machine, and
   (g) means operative by the rotation of said handle for securing said brush magazine to said stationary means.

7. In a dynamoelectric machine including a rotating cylindrical contact surface and a stationary contact member which is positioned adjacent to but spaced from the cylindrical contact surface and which is to be electrically connected to the cylindrical contact surface, a removable brush magazine arrangement for electrically connecting the cylindrical contact to the stationary contact member comprising:
   (a) a brush magazine formed of an insulating material,
   (b) guide means formed on opposite outer walls of said brush magazine,
   (c) stationary means for supporting said brush magazine, said stationary means provided with mating guide means for receiving said guide means formed on said brush magazine so as to assure proper alignment of said brush magazine on the machine,
   (d) a plurality of brushes mounted in said brush magazine, and having one end normally extending from one end of said magazine to engage the cylindrical contact surface,
   (e) a plurality of electrical connectors secured to a third outer wall of said brush magazine, said connectors being connected to said brushes by flexible conductors,
   (f) a bus bar supported by said stationary means, connected to said stationary contact member, and positioned to engage said electrical connectors,
   (g) a rotatable handle formed of an insulating material secured to said brush magazine useful for removing said brush magazine from and replacing said brush magazine in the dynamoelectric machine, and
   (h) means operative by the rotation of said handle for securing said brush magazine to said stationary means, whereby said brushes positively engage the cylindrical contact surface, and said connectors positively engage the bus bar.

8. The removable brush magazine arrangement defined in claim 7 wherein a plurality of resilient members are interposed between other ends of said brushes and said brush magazine for biasing the one ends of said brushes into engagement with the cylindrical contact surface.

9. The removable brush magazine arrangement defined in claim 8 wherein portions of said electrical connectors which engage said bus bar are resilient, and said arrangement further comprises:
   (a) means operative by said resilient portions of said connectors for retaining said brushes in said brush magazine while said brush magazine is being positioned with respect to said machine, said resilient portions of said connectors being deflected away from said third outer wall as said brush magazine is being positioned with respect to said machine, the deflection of said resilient portions of said connectors causing said means to release said brushes to engage the cylindrical contact surface.

10. The removable brush magazine arrangement defined in claim 7 wherein said stationary means comprises a spaced pair of radially extending annular rings, said guide means comprise grooves formed on facing walls of said rings, and said mating guide means comprises abutments formed on opposite outer walls of said brush magazine, whereby said brush magazine is supported between said rings.

11. The removable brush magazine arrangement defined in claim 10 wherein said rings are formed of an insulating material.

12. The removable brush magazine arrangement defined in claim 11 wherein said bus bar extends axially between said rings, and is supported by said rings and connected to a collector ring secured to the outer surface of one of said rings, said collector ring being connected to said stationary contact member.

13. The removable brush magazine arrangement defined in claim 10 wherein said abutments extend from an end of said magazine opposite said one end, said rotatable handle being pivotally secured to said extensions of said abutments, and an insulating cover which is also pivotally secured to said extensions of said abutments, is interposed between the insulated rotatable handle and the brush magazine to further protect the operator from the danger of electrical shock.

14. In a dynamoelectric machine including a rotating cylindrical contact surface and a stationary contact member which is positioned adjacent to but spaced from the cylindrical contact surface and which is to be electrically connected to the cylindrical contact surface, a removable brush magazine arrangement for electrically connecting the cylindrical contact to the stationary contact member comprising:

(a) a generally rectangular brush magazine formed of an insulating material and having open top and bottom ends, (b) a pair of spaced radially extending annular rings, formed of an insulating material, for supporting said brush magazine adjacent the cylindrical contact surface, (c) abutments formed on two opposite outer walls of said brush magazine, said abutments having portions projecting above the top end of said brush magazine, said abutments serving as guide means, (d) grooves formed on facing walls of said rings, said grooves shaped to receive said abutment, so as to assure proper alignment of said brush magazine on the machine, (e) a plurality of brushes mounted in said brush magazine, and having one end normally extending from said open bottom end of said magazine so as to engage the cylindrical contact surface, (f) a plurality of resilient members interposed between other ends of said brushes and said brush magazine for biasing the one ends of said brushes into engagement with the cylindrical contact surface, (g) a plurality of electrical connectors secured to a third outer wall of said brush magazine, each of said connectors being proved with first and second resilient portions adjacent the bottom end of said brush magazine, another portion of each of said connectors being connected to one of said brushes by a flexible conductor, (h) said first resilient portions extending under said brushes to retain said brushes in said brush magazine while said brush magazine is being positioned with respect to said machine, (i) a bus bar extending axially between said spaced rings and supported by said rings, said bus bar being connected to a collector ring secured to an outer surface of one of said rings, said collector ring in turn being connected to the stationary contact, said bus bar being provided with means for engaging said resilient portions of said connectors, said second resilient portions of said connectors being deflected away from said third outer wall on which said connectors are secured as said brush magazine is being positioned with respect to said machine, the deflection of said second resilient portions of said connectors withdrawing said first resilient portions from under said brushes to release said brushes to engage the cylindrical contact surface, (j) a rotatable handle formed of an insulating material pivotally secured to said portions of said abutments projecting above said top end of said brush magazine, said insulated handle protecting an operator from the danger of electrical shock when removing and replacing said brush magazine while the machine is energized, (k) an insulating cover secured to said portions of said abutments projecting above said top end of said brush magazine, said cover being interposed between the insulated rotatable handle and said brush magazine to further protect the operator from the danger of electrical shock, (l) a pair of dogs attached to said rings and extending over the periphery of said rings adjacent said grooves, (m) a pair of projections extending from said handle, whereby rotation of said handle causes said projections to be engaged by said dogs to secure said brush magazine to said annular rings, said brushes positively engaging the cylindrical contact surface after being released by said arms, and said resilient portion of said connectors positively engage said bus bar, so as to form an electrical circuit between said cylindrical contact surface and the stationary contact member.

15. In dynamoelectric machine including a rotating cylindrical contact surface and a stationary contact member which is positioned adjacent to but spaced from the cylindrical contact surface and which is to be electrically connected to the cylindrical contact surface, a removable brush magazine arrangement for electrically connecting the cylindrical contact to the stationary contact member comprising:

(a) a metal brush magazine, (b) stationary metal means for supporting said brush magazine adjacent the cylindrical contact surface, said stationary metal means electrically connected to said stationary contact member, (c) a plurality of brushes mounted in said brush magazine, and having one end normally extending from said magazine to engage the cylindrical contact surface, (d) means for electrically connecting said brushes to said metal brush magazine, (e) a rotatable insulating handle secured to said brush magazine useful for removing said brush magazine from and replacing said brush magazine in the machine, and (f) means operative by the rotation of said handle for securing said brush magazine to said stationary metal means, whereby said brushes positively engage the cylindrical contact surface, and the cylindrical contact surface is connected to the stationary contact member through said brushes, said metal brush magazine and said stationary metal means.

16. The removable brush magazine arrangement defined in claim 15 wherein the stationary metal means for supporting said brush magazine comprises a spaced pair of radially extending annular rings, and a metal cross-bar which extends between said rings, over the cylindrical contact surface, said metal brush box being supported by said cross-bar between said rings.

17. The removable brush magazine arrangement defined in claim 16 wherein said cross bar is provided with a slot, which is tapered toward the cylindrical contact, and said brush magazine is provided with wedged-shaped portion which mates with the slot, said means operative by the rotation of said handle causing a pressure engagement between walls of said slot tapered toward the cylindrical contact and walls of said wedged-shaped portion to assure a good electrical connection between the brush magazine and said stationary metal means.

18. The removable brush magazine arrangement defined in claim 15 wherein retaining means are provided for securing said brushes in said brush magazine while said brush magazine is being positioned with respect to the machine, said retaining means being released by the same rotation of said handle which secures said brush magazine to said stationary metal means, to permit said brushes to assume their normal position in contact with the cylindrical contact surface.

19. The removable brush magazine arrangement defined in claim 18 wherein said retaining means comprises:
 (a) a lever pivotally mounted on said metal brush magazine,
 (b) an eccentric rotatable by said handle, biasing a portion of said lever,
 (c) fingers provided on said lever for retaining said brushes in said brush magazine, rotation of said eccentric by said handle when said handle is rotated to secure said brush magazine to said stationary metal means, causing said eccentric to release the bias on said lever which maintains said fingers in retaining engagement with said brushes, thereby releasing said brushes to permit said brushes to assume their normal position in contact with the cylindrical contact surface.

20. The removable brush magazine arrangement defined in claim 15 wherein said means for securing said brush magazine to said stationary metal means comprises:
 (a) a shaft connected for rotation with said handle, and passing through a hole in said metal brush magazine,
 (b) a cammed surface surrounding a hole for receiving said shaft provided in said stationary metal means,
 (c) a projection on said shaft, such that said brush magazine assembly is secured to said stationary metal means by rotating said handle to cause said projection to engage said cammed surface,
 (d) a resilient member for applying pressure between said shaft and said brush magazine to cause a pressure engagement between said projection and said cam, and between said stationary metal means and said metal brush magazine, so as to provide a good electrical connection between said stationary metal member and said metal brush magazine.

References Cited

UNITED STATES PATENTS 3,045,136  7/1962  Consterdine _____ 310—238
3,075,110  1/1963  Pepworth _____ 310—240

MILTON O. HIRSHFIELD, *Primary Examiner.*

G. NUNEZ, *Assistant Examiner.*